* Instantaneously at Same Polarity

✻ Rendered Conducting
○ Rendered Non-conducting
✻✻ Rendered Conducting
● Rendered Non-conducting United States Patent Office 2,879,386
Patented Mar. 24, 1959

2,879,386
ELECTRIC DISCHARGE APPARATUS
Donald R. Scholtes, Amhurst, N.Y., assignor to Westinghouse Electric Corporation, East Pittsburgh, Pa., a corporation of Pennsylvania
Application May 10, 1955, Serial No. 507,215
8 Claims. (Cl. 250—27)

This invention relates to electric discharge apparatus and has particular relation to heat control apparatus for electric resistance welding systems.

In high precision electric resistance welding systems the welding current is supplied from an alternating current supply through electric discharge devices such as ignitrons which are called main discharge devices to distinguish them from the control discharge devices, and the magnitude of the heat supplied for welding is controlled by controlling the phase angle in the alternating current potential at which the devices are rendered conducting. Such control is called heat control. In welding of materials such as aluminum, magnesium and their alloys and stainless steel, it is desirable that the current supply for welding have a composite waveform. Usually, the waveform has three principal components, a pre-heat component during which the current is increased gradually from a predetermined minimum to the welding magnitude, a welding component during which the current remains at the welding magnitude, and a post-heat or annealing component during which the welding current decreases from the welding magnitude to a predetermined minimum. For less critical materials the current supplied during the welding interval may have only two of the above three components as, for example, a pre-heat or a post-heat component and a weld component. Usually in these situations there is a pre-heat component and a weld component. The pre-heat component is sometimes referred to as up-slope control and the post-heat as down-slope control.

In the welding of the above-mentioned materials and on occasions in the welding of like materials, such as mild steel, for example, it is essential that the heat control be highly precise; that is, that the current supply for welding at any setting of the heat control unit be precisely determinable within a few percent. Heat control apparatus particularly for high precision welding, constructed in accordance with the teachings of the prior art, has been highly complex.

It is accordingly an object of this invention to provide heat control apparatus for electric resistance welding which shall operate with precision as high as has been previously obtainable, and, at the same time, shall be of relatively simple structure and of low cost.

An incidental object of this invention is to provide a novel circuit including electric discharge apparatus particularly suitable for the heat control of a high precision electric resistance welding system.

Another incidental object of this invention is to provide a novel time constant circuit particularly suitable for up-slope and down-slope control.

In accordance with the invention, heat control apparatus is provided in which a capacitor is charged through electric discharge paths during alternate half periods of the alternating current supply for the main devices, and the potential across the capacitor is impressed to control the main devices for heat control purposes; that is, to cause the main devices to conduct at selected instants. The capacitor and the discharge devices are so connected to the supply that one of the discharge devices conducts for a relatively short interval to charge the capacitor to one polarity during one of the half periods of the supply and during the succeeding half period of the supply, the other device conducts for a short interval of time to discharge and recharge the capacitor to the opposite polarity. Thus, the potential across the capacitor is of substantially square wave form and varies abruptly at intervals of a half period, rising from a minimum magnitude to a maximum magnitude at the beginning of one of these half-period intervals, and falling from a maximum magnitude to a maximum magnitude of the opposite polarity at the beginning of the next interval. The main devices are rendered conducting during the instants when the capacitor potential rises or falls and the heat control is effected by rendering conducting the discharge devices in circuit with the capacitor at predetermined instants in the half periods of the potential impressed on the main discharge devices and thus producing the abrupt rise and fall of the capacitor potential at these instants. Because the variation of the firing is sharp during the instants when the main discharge devices are fired, the firing is highly precise.

The novel features considered characteristic of this invention are described generally above. The invention itself both as to its organization and its method of operation, together with additional objects and advantages thereof, will be understood from the following description of specific embodiments when read in connection with the accompanying drawings, in which.

Figure 1:
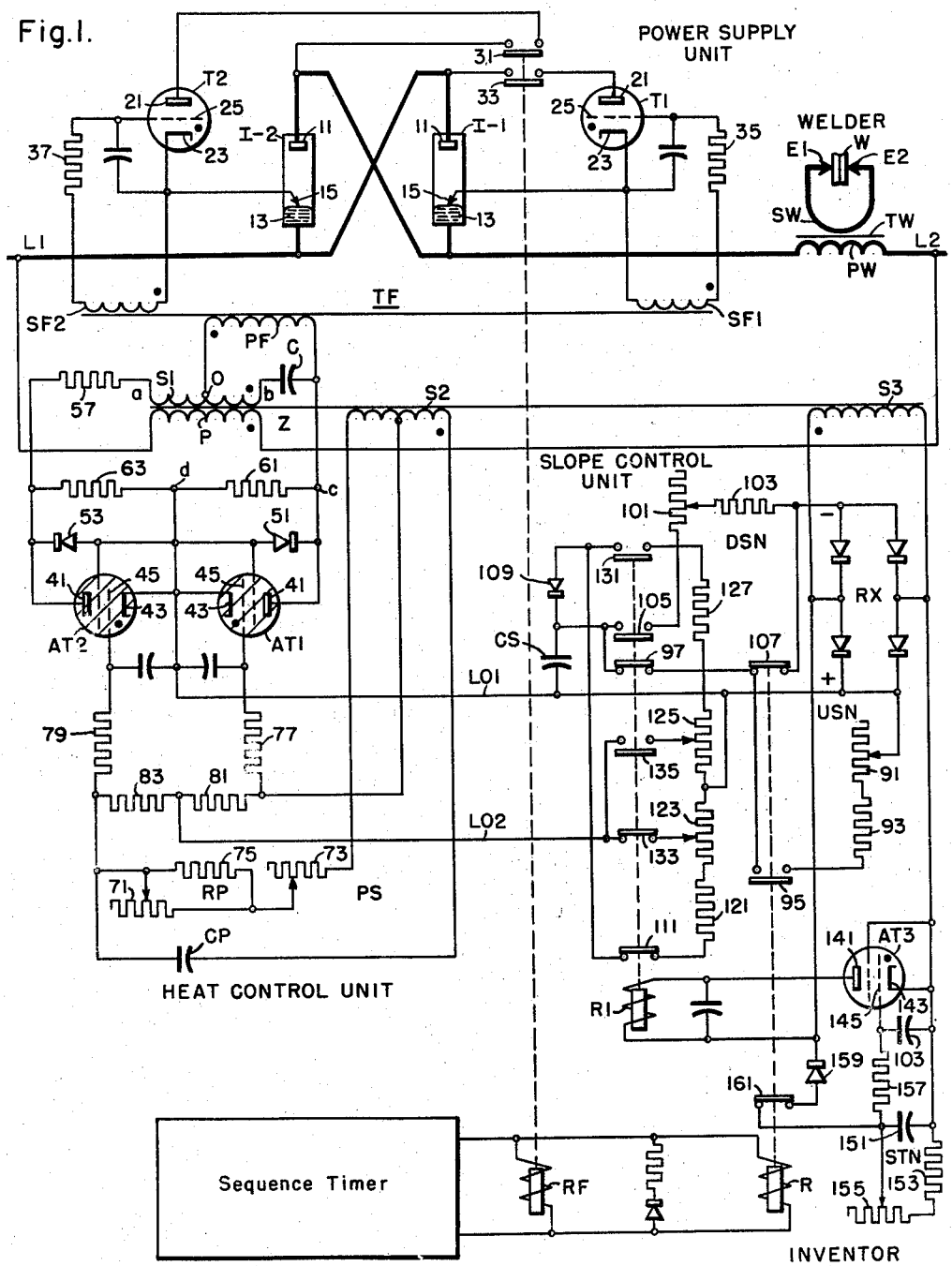
Figure 1 is a circuit diagram of a preferred embodiment of the invention.

*Figure 1—description*

The apparatus shown in Fig. 1 comprises a Welder, a Power Supply Unit, a Heat Control Unit, a Slope Control Unit and a Sequence Timer. This apparatus is supplied from the buses or conductors L1 and L2 which are energized from the usual commercial 220 or 240 volt supply.

The Welder includes a welding transformer TW having a primary PW and a secondary SW. A pair of welding electrodes E1 and E2 are connected across the secondary SW, and, in the use of the welder, work W is interposed between the electrodes E1 and E2. The welder may also include the conventional components such as fluid-pressure supply means for causing the electrodes E1 and E2 to engage the work W and back-pressure contacts.

The Power Supply Unit includes a pair of ignitrons I–1 and I–2 with each of which a firing thyratron T1 or T2 is associated. The ignitrons I–1 and I–2 each has an anode 11, a cathode 13 and an igniter 15. The thyratrons T1 and T2 each has an anode 21, a cathode 23 and a control electrode 25. The ignitrons I–1 and I–2 are connected in anti or inverse parallel between the conductors L1 and L2 through the primary PW of the welding transformer TW.

The anode 21 of each of the thyratrons T1 and T2 is connected to the anode 11 of the associated ignitrons I–1 and I–2 through the contacts 31 and 33 of a firing relay RF controlled from the Sequence Timer. The cathode 23 of each of the thyratrons T1 and T2 is connected to the igniter 15 of the associated ignitron. The control electrode 25 of each of the thyratrons T1 and T2 is connected to its cathode 23 through grid resistors 35 and 37 and the secondaries SF1 and SF2, respectively, of a firing transformer TF. It is one of the features of this invention that there need be no blocking bias impressed in the control circuits of the thyratrons T1 and T2 to maintain them nonconducting in the standby condition of the apparatus. The necessary blocking effect is produced by the Heat Control Unit.

In apparatus which has been found to operate satisfactorily, the Power Supply Unit has the following components. This data is presented here with the understanding that it does not in any way limit the scope of this invention, the only purpose of presenting the data being to aid those skilled in the art in practicing the invention.

| | |
|---|---|
| Firing thyratrons T1 and T2 | WL5796. |
| Grid resistors | 100,000 ohms. |
| Surge suppressor capacitors | .002 microfarad. |
| Ignitrons I–1 and I–2 | Selected suitable for the welding to be carried out. |

The Heat Control Unit includes a pair of thyratrons AT1 and AT2. Each thyratron has an anode 41, a cathode 43 and a control electrode 45. The Heat Control Unit also includes a capacitor C. Power is supplied to the Heat Control Unit from one secondary S1 of a transformer Z. The secondary S1 has end terminals (labeled $a$ and $b$) and an intermediate tap (labeled $o$). The Heat Control Unit also includes a pair of rectifiers 51 and 53.

The anode 41 and cathode 43 of one of the thyratrons AT1 is connected conductively in a series circuit including in the order mentioned a terminal ($b$) of the secondary S1, the capacitor C, the anode 41 and cathode 43 of the thyratrons AT1, one of the rectifiers 53, a current limiting resistor 57, to the other terminal ($a$) of the secondary S1. The other thyratron AT2 is similarly conductively connected in a circuit extending from the latter terminal ($a$) of the secondary S1, through the current limiting resistor 57, the anode 41 and cathode 43 of thyratron AT2, the other rectifier 55, the capacitor C, to the other terminal. The primary PF of the firing thyratron TF is connected between the intermediate terminal ($o$) of the secondary S1 and the junction of the capacitor C and the anode of thyratron AT1. The anode 41 and cathode 43 of each of the thyratrons AT1 and AT2 is shunted by resistors 61 and 63, respectively. The resistors 61 and 63 (and 57 which is small) and the capacitor C are so related in magnitude that when the thyratrons AT1 and AT2 are nonconducting, the potentials across the secondaries SF1 and SF2 lag the anode potential across the associated thyratrons T1 and T2 by an angle of the order of ⅜ of a period. Thus, even if the thyratrons AT1 and AT2 fail to conduct when the relay RF is energized, thyratrons T1 and T2 are held off until late in the period of the potential impressed on them, and damage by improper firing of these thyratrons is prevented. Thus the necessity of blocking bias in the control circuits of the thyratrons T1 and T2 is avoided.

The thyratrons AT1 and AT2 are controlled by a composite potential including a direct current component derived from the output conductors LO1 and LO2 of the Slope Control Unit and an alternating current component from a phase shift network PS. The phase shift network includes an additional secondary S2 of the transformer Z. This secondary like the secondary S1 has end terminals and an intermediate tap. The phase shift network PS also includes a capacitor CP, and a resistance network RP including a pair of variable resistors 71 and 73 connected in series and a fixed resistor 75 shunting one of the variable resistors 71. The network RP is connected to one end terminal of the secondary S2 and the capacitor CP is connected between the resistors RP and the other end terminal. The resistor 73 is usually set so that the ignitrons I–1 and I–2 can be fired at no earlier an instant than that corresponding to the power factor of the welder and the material being welded; the resistor 71 is set for the desired heat control.

The control circuit for the thyratrons AT1 and AT2 also includes a pair of grid resistors 77 and 79 and a pair of resistors 81 and 83. The cathodes of the thyratrons AT1 and AT2 are connected together to one of the output conductors LO1 from the Slope Control Unit. The other output conductor LO2 of the Slope Control Unit is connected to the junction of the resistors 81 and 83. Each of the control electrodes 45 is connected to the remaining terminal of a resistor 81 and 83, respectively, through one of the grid resistors 77 and 79. The intermediate tap of the secondary S2 is connected to the junction of the grid resistor 77 and one of the resistors 81, and the junction of the resistors RP and the capacitor CP is connected to the junction of the other grid resistor 79 and the other resistor 83. The potential impressed in the control circuits of the thyratrons AT1 and AT2 is thus composite consisting of the potential from the conductors LO1 and LO2 and the potential from the phase shift network PS which is displaced in phase with reference to the potential from the secondary S1 by an angle determined by the setting of the resistors 71 and 73.

To aid those skilled in the art in practicing this invention, the following table presents the component magnitudes of a Heat Control Unit which has been found to operate satisfactorily.

| | |
|---|---|
| Thyratrons AT1 and AT2 | WL2050. |
| Capacitor C | 1 microfarad. |
| Resistors 61 and 63 | Each 10,000 ohms. |
| Current limiting resistor 57 | 100 ohms. |
| Grid resistors 77 and 79 | Each 220,000 ohms. |
| Resistors 81 and 83 | Each 60,000 ohms. |
| Capacitor CP | 1 microfarad. |
| Variable resistors 71 | Each 10,000 ohms. |
| Variable resistor 73 | 6,000 ohms. |
| Fixed resistor 75 | 15,000 ohms. |
| Potential between end terminal and intermediate tap S1 | 57 volts. |
| Potential between end terminal and intermediate tap S2 | 57 volts. |
| Surge suppressor capacitor | .001 microfarad. |
| Capacitor across relay R1 | 1 microfarad. |

The Slope Control Unit includes a slope control capacitor CS, a rectifier RX of the bridge-type, a thyratron AT3, a slope control timing network STN, an up-slope network USN, a down-slope network DSN, and a controlling relay R1. The network RX is supplied from a secondary S3.

The up-slope network USN includes a variable resistor 91 and a fixed resistor 93, which are adapted to be connected across the capacitor CS through normally open contacts 95 of relay R controlled from the Sequence Timer and normally closed contacts 97 of the relay R1. The down-slope network includes a variable resistor 101 and a fixed resistor 103, which are adapted to be connected to the capacitor CS through normally open contacts 105 of the relay R1. The capacitor CS is connected across the network RX through normally closed contacts 97 and 107 of the relays R1 and R, in such a sense that its upper plate is charged negative and its lower plate positive.

The lower positive plate is connected to the conductor LO1; the upper negative plate is connected through a rectifier 109 and normally closed contacts 111 of the relay R1 to one terminal of a voltage divider consisting of a series network of resistors 121, 123, 125 and 127. The upper plate of the capacitor CS is also adapted to be connected to the other terminal of the divider through the rectifier 109 and the normally open contacts 131 of the relay R1. The adjustable arm of one of the variable resistors 123 is connected to the conductor LO2 through normally closed contacts 133 of the relay R1, and the adjustable arm of the other variable resistor 125 is adapted to be connected to the conductor LO2 though the normally open contacts 135 of the relay R1. Thus, depending on the position of the relay R1, the potential LO2 is at the potential of the adjustable arm of one or the other of the variable resistors 123 or 125, and the variable resistor so connected is, in turn, connected through a fixed resistor 121 or 127 to the negative plate of the capacitor CS. The resistors 123 and 125 may be set to give the desired currents at the beginning and end of a welding interval. The circuit just disclosed has the advantage that it permits up-slope, down-slope and weld current control with a single capacitor CS.

The thyratron AT3 has an anode 141, a cathode 143 and a control electrode 145. The network STN consists of a capacitor 151 shunted by a fixed resistor 153 and a variable resistor 155. The anode 141 of thyratron AT3 is connected to one terminal of the secondary S3 through the coil of relay R1. The cathode 143 is connected to the other terminal. The control electrode 145 is connected to the cathode through a grid resistor 157 and the network STN.

The network STN is charged from the secondary S3 through a rectifier 159 and normally closed contacts 161 of relay R. The rectifier is so connected that the network STN is charged with its plate electrically nearest to the control electrode 145 of thyratron AT3 negative. The charge on network STN then maintains the thyratron AT3 nonconducting.

To aid those skilled in the art in practicing this invention, the following table presents the components of a Slope Control Unit which has been found to operate satisfactorily.

| | |
|---|---|
| Capacitor CS | 4 microfarads. |
| Thyratron AT3 | WL2050. |
| Potential S3 | 115 volts. |
| Variable resistors 123 and 125 | Each 100,000 ohms. |
| Fixed resistors 121 and 127 | Each 150,000 ohms. |
| Variable resistor 91 | 50,000 ohms. |
| Fixed resistor 93 | 3,300 ohms. |
| Variable resistor 101 | 50,000 ohms. |
| Fixed resistor 103 | 3,300 ohms. |
| Capacitor 151 | ½ microfarad. |
| Variable resistor 153 | 500,000 ohms. |
| Fixed resistor 155 | 6,800 ohms. |
| Grid resistor 157 | 100,000 ohms. |
| Surge suppressor capacitor 163 | .0022 microfarad. |

The Sequence Timer may be of any type known in the art. Such sequence timers include a thyratron or like component (not shown) which is rendered conducting at the beginning of the overall weld interval, and remains conducting during the whole of this interval. During the weld interval, all of the components of the welding current are supplied. In the practice of this invention, this thyratron is connected to energize the relays RF and R.

*Standby—Figure 1*

In the standby condition, power is supplied to the conductors L1 and L2. The transformer Z is then energized and potential is available across the secondaries S1, S2 and S3. The cathodes of the various thyratrons are then heated and the apparatus is in a condition ready to operate. The apparatus will be described in the standby condition with reference to Fig. 3 and Fig. 4. In these views it is assumed that the potential from $a$ to $b$ is in phase with the potential from L2 to L1.

Figure 3:
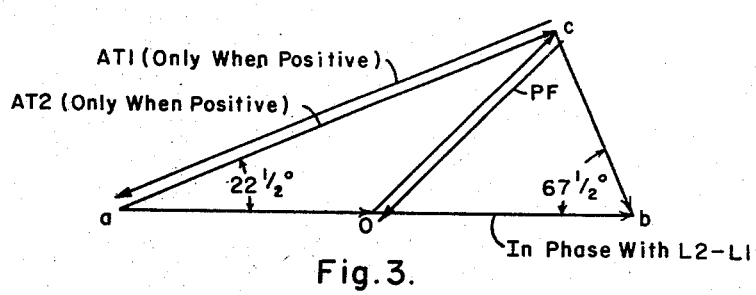
Fig. 3 is a vector diagram showing the relationships of the potentials impressed in the heat control circuit in the practice of this invention.

Fig. 3 is a vector diagram showing the relationship of certain of the potentials of the heat control unit, assuming the impedance of PF to be very high compared to the other impedances, and specifically of the potentials appearing across the secondary S1, the capacitor C and the resistors 61 and 63 in parallel with the thyratrons AT1 and AT2, when the thyratrons AT1 and AT2 are nonconducting. For convenience in reading Fig. 3, the network to which it applies is labeled at various points to correspond to the terminals of the vectors; that is, the vector $ao$ represents the potential appearing across the left-hand half of the secondary S1, the vector $ob$ the potential appearing across the other half, the vector $cb$ the potential across the capacitor C, and the vector $ac$ the potential across the resistors 61, 63 and 57, which, in effect, is the potential across the resistors in parallel with the thyratrons AT1 and AT2, since the current limiting resistor 57 is negligibly small. It is seen that the resistors 61 and 63 and the capacitor C are so related that with the thyratrons AT1 and AT2 nonconducting, the vector $co$ which represents the potential across the primary PF, lags the potential across the secondary S1 in phase by about 135° or ⅜ of a period. The secondaries SF1 and SF2 are so wound that their potential lags the anode potential impressed between the anodes 21 and cathodes 23 of thyratrons T1 and T2 when the contacts of relay RF are closed by ⅜ of a period, and thus when thyratrons AT1 and AT2 are nonconducting and the relay RF is energized, the thyratrons T1 and T2 can be fired only very late in their positive half periods. The vectors $ac$ and $ca$ correspond to the potentials across thyratrons AT1 and AT2, respectively, when these thyratrons are nonconducting, but this voltage across each thyratron has a sinusoidal waveform only during the half periods when the anode 41 of the associated thyratron is positive relative to the cathode 43. During the intervening half periods the voltage collapses to substantially zero because of the rectifiers 51 and 53, respectively.

Figure 4A:
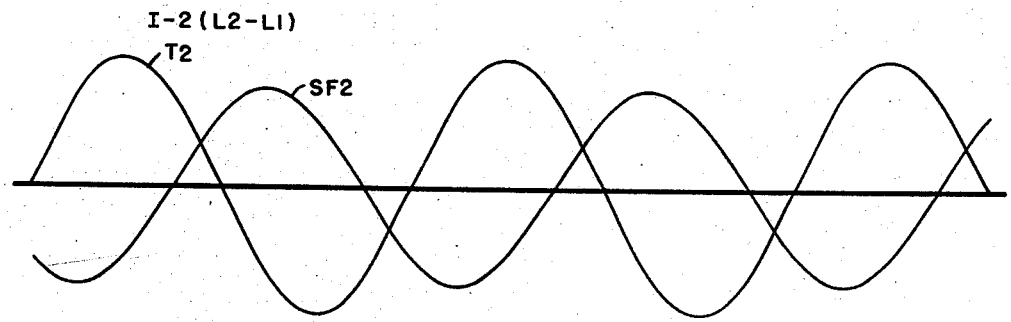
Figs. 4A to 4D are graphs showing the waveform of the various potentials which are impressed in the practice of this invention.
Figure 4B:
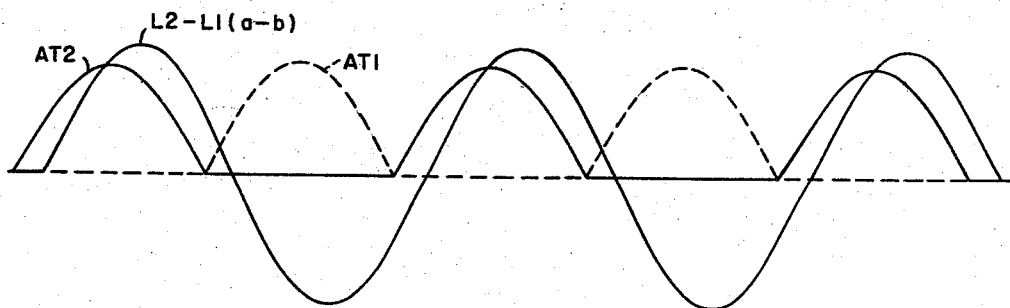

The relationship between the anode-cathode potential of ignitron I-2 or of thyratron T2, with the relay RF energized, and the potential impressed on the secondary SF2 with the thyratrons AT1 and AT2 nonconducting, is shown in Fig. 4A, in which voltage is plotted vertically and time horizontally. The relationship between the potentials impressed across thyratron AT1 and thyratron AT2 and the potential L2—L1, so long as thyratrons AT1 and AT2 are nonconducting, is shown in Fig. 4B, in which again voltage is plotted vertically and time horizontally. It is seen that the potential across each AT1 and AT2 has the waveform of half sine waves since during alternate half periods the anodes and cathodes of AT1 and AT2 are shunted by the rectifiers 51 and 53. In practice, AT1 and AT2 will be nonconducting during the time preceding weld only if the initial current adjustment is set for minimum welding current and during the post-heat interval if the final current adjustment is set for a minimum. Of course, AT1 and AT2 will not conduct if one of their tubes fails.

Now, in the standby condition of the apparatus, the relays R and R1 and RF are deenergized and their contacts are in the positions shown in Fig. 1. Under such circumstances, the thyratrons T1 and T2 are disconnected from the conductors L1 and L2, and the ignitrons I-1 and I-2 are nonconducting because their respective firing circuits are open. The secondary S3 being energized, the network STN is charged through normally closed contacts 161, and thyratron AT3 is nonconducting. In addition, the rectifier RX is energized and the capacitor CS is charged through the normally closed contacts 97 and 107 of relays R1 and R, so that its plate connected to conductor LO1 is positive and the other plate negative. The latter plate is connected through normally closed contacts 111 of relay R1, the fixed resistor 121, and a variable resistor 123, to conductor LO1 and the adjustable arm of the variable resistor is connected to conductor LO2. The potential of this conductor LO2 is then negative. A negative potential is thus superimposed on the potential from the phase shift network PS. This potential may be so set as to render thyratron AT1 conducting at any instant between 0 and 157½° on the voltage wave L2—L1 (Fig. 4B) and AT2 conducting one half period later. The condition which arises when AT1 is rendered conducting at an instant between 0 and 90° is presented graphically in Fig. 4C, and the condition when AT1 is rendered conducting at an instant between 90° and 157½° is presented in Fig. 5. In each graph, voltage is plotted vertically and time horizontally.

Figure 4C:
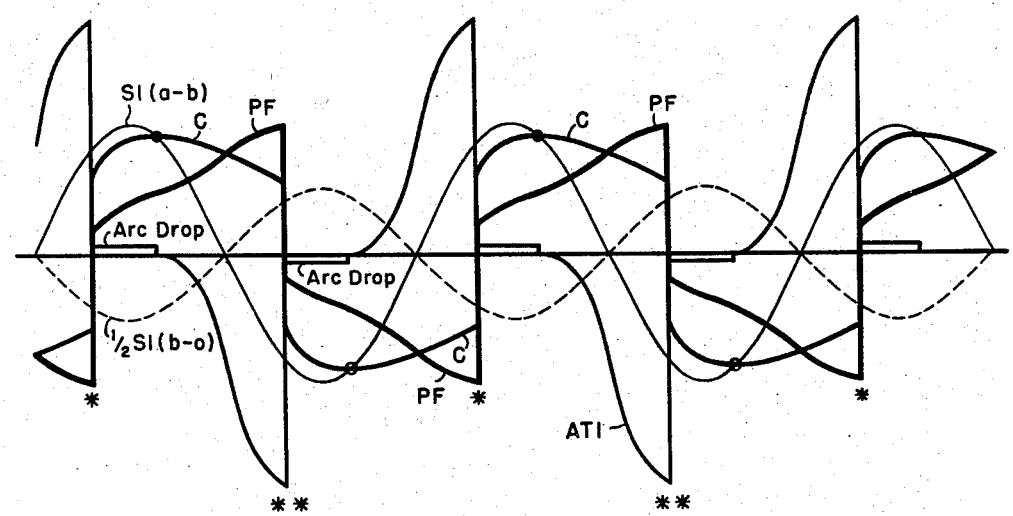

Assume that the thyratron AT2 is rendered conducting as shown in Fig. 4C. Current then flows from the terminal $a$ of secondary S1 through the current limiting resistor 57, the anode 41 and cathode 43 of thyratron AT2, the rectifier 51 in series with it, the capacitor C, to terminal $b$. The anode voltage of AT2 is represented by the light medium curve of Fig. 4C. Before the conduction, the voltage is rising gradually, as represented by the potrion of the curve on the extreme left; after the conduction, this potential falls to the arc-drop magnitude. Since the impedance in the circuit is very small, the capacitor C is instantaneously charged to the potential of secondary S1 at the firing and thereafter rises gradually to a potential equal to the peak potential of S1 less the arc-drop across AT2; as the potential of S1 then falls, the charge on the capacitor C decreases because it is being discharged through resistance 61; but, since the impedance of primary PF is high as is also the resistance 61, this discharge is at a lower rate than the drop in potential of S1 so that soon the capacitor potential is higher than the voltage of S1 and thyratron AT1 stops conducting. The medium curve in Fig. 4C represents the capacitor potential. The potential across primary PF is the capacitor potential less ½ the potential of S1 from O to B (shown dotted in Fig. 4C). The curve for the potential PF is shown heavy in Fig. 4C.

At a corresponding instant in the succeeding half period of the potential of conductors L1 and L2, thyratron AT1 is rendered conducting. The capacitor C is now discharged and recharged to the opposite polarity. In this case, again, the impedance in the discharging and charging circuit in series with the capacitor C is low so that the discharge and recharge of the capacitor C is abrupt and the thyratron AT1 is rendered nonconducting when the capacitor potential exceeds the potential of S1. Capacitor C is now charged to a potential such that the anode 41 of thyratron AT2 is positive relative to its cathode and discharges at a low rate. At a corresponding instant in the next half period of the potential of L1—L2, thyratron AT2 is again rendered conducting, and the above-described process is repeated.

Figure 4D:
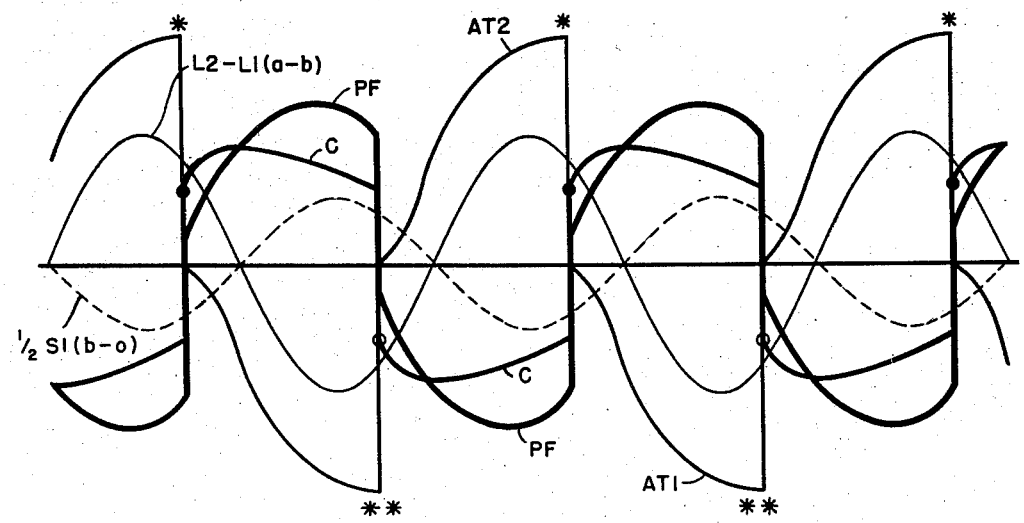

A similar situation arises when thyratrons AT2 and AT1 are rendered conducting late in the half periods of S1. This situation is represented by Fig. 4D. It is seen that in this case thyratrons AT1 and AT2 are rendered nonconducting immediately on the charging of the capacitor because at the instant when the capacitor is charged, the potential of S1 is falling. In actual practice, the setting will be such that during standby the thyratrons AT2 and AT1 are rendered conducting late in the half periods of the supply.

Thus, during the standby condition, the potential across secondaries SF1 and SF2 is such as to tend to render the thyratrons T1 and T2 conducting late in the half periods of the supply, L1—L2, but these thyratrons are not rendered conducting because relay RF is deenergized. In the standby condition, also, thyratrons AT1 and AT2 conduct alternately, and as each conducts, it impresses a potential across the other such that the other may be rendered conducting at any time during the half period following the conduction of the former.

*Operation—Figure 1*

During operation, the work is interposed between the electrodes E1 and E2, the resistors 71 and 73 are set at the desired heat and power factor settings, and a starting switch in the Sequence Timer is closed. The Sequence Timer first operates to engage the electrodes E1 and E2 with the work W under pressure. After the electrodes E1 and E2 are properly seated on the work, the device which times the welding interval is actuated and relays R and RF are actuated.

The actuation of relay RF closes the circuits between the anodes 21 of the thyratrons T1 and T2 and the anodes 11 of the ignitrons I–1 and I–2. The thyratrons T1 and T2 may now be rendered conducting at instants in the periods determined by the potential supplied to the secondaries SF1 and SF2. This potential is intitially determined by the setting of the variable resistor 123 in series with the conductor LO2 and the normally closed contacts 133 of relay R1. The actuation of relay R closes the circuit USN through contact 95 connecting this network across the capacitor CS. The capacitor now discharges through the resistors 91 and 93 in the network USN during a time interval determined by the setting of the variable resistor 91 in this network. The discharge is through the normaly closed contacts 97 of relay R1 and the now closed contacts 95 of relay R. The potential on the capacitor CS then decays decreasing the negative potential impressed on the control electrodes of the thyratrons AT1 and AT2, and the latter are rendered conducting earlier and earlier in the half periods of the alternating potential L1—L2. As the thyratrons AT1 and AT2 are rendered conducting earlier, abrupt potentials are impressed through the secondaries SF1 and SF2 in the control circuits of the thyratrons T1 and T2 rendering them conducting earlier and earlier in the half periods of the supply L1 and L2, and rendering the associated ignitrons I–1 and I–2 correspondingly conducting. Gradually increasing current then flows through the primary PW and the work W is pre-heated.

After a predetermined time interval determined by the setting of the resistor 91 in network USN, the capacitor CS is substantially completely discharged. Thereafter, the firing of the thyratrons AT1 and AT2 takes place at instants in the periods of the conductors L1 and L2 which are determined solely by the setting of the heat control adjustment 71 and which no longer vary. At this point, the conduction through the ignitrons I–1 and I–2 has reached a magnitude such that the welding current flows. This conduction now continues during the welding interval.

This continues while the network STN times out. This network was originally charged through the normally closed contacts 161 of relay R, but on the opening of these contacts, timed out. When network STN times out, thyratron AT3 is rendered conducting energizing relay R1. The capacitor CS is now connected to the rectifier RX through the resistors 101 and 103 in the network DSN and through the now closed contacts 105 of relay R1, and it is charged to the same polarity as during stand-by. The impedance of the final current adjustment 125 is high enough compared with the down-slope time adjustment 101 so that variation in the final voltage on CS is only a few per cent over the total range of adjustment of 101.

The rate of charge of the capacitor CS is determined by the variable resistor 101 in the network DSN. This varying potential is impressed on the conductor LO2 through the variable resistor 125 and the now closed contacts 135 of relay R1. As the potential increases, the thyratrons AT1 and AT2 and the ignitrons I–1 and I–2 are rendered conducting later and later in the half periods of the supply L1 and L2. Correspondingly, the current flow through the primary PW thus decreases and the work is annealed. The decrease continues until the capacitor CS reaches a maximum potential. At this point, the current flow through the ignitrons I–1 and I–2 is at a minimum determined by the setting of the variable resistor 101 now connected to the capacitor and by the variable resistor 125.

The weld component of the Sequence Timer is next deenergized permitting relays RF and R to drop out, and the apparatus may now be reset for another weld. At this point, the network STN is recharged rendering the thyratron AT3 nonconducting. Relay R1 drops out charging the capacitor CS to the full potential across the rectifier RX. The thyratrons AT1 and AT2 are then rendered conducting at instants late in the periods of the supply L1—L2 and the apparatus is reset for a new welding operation.

Figure 2:
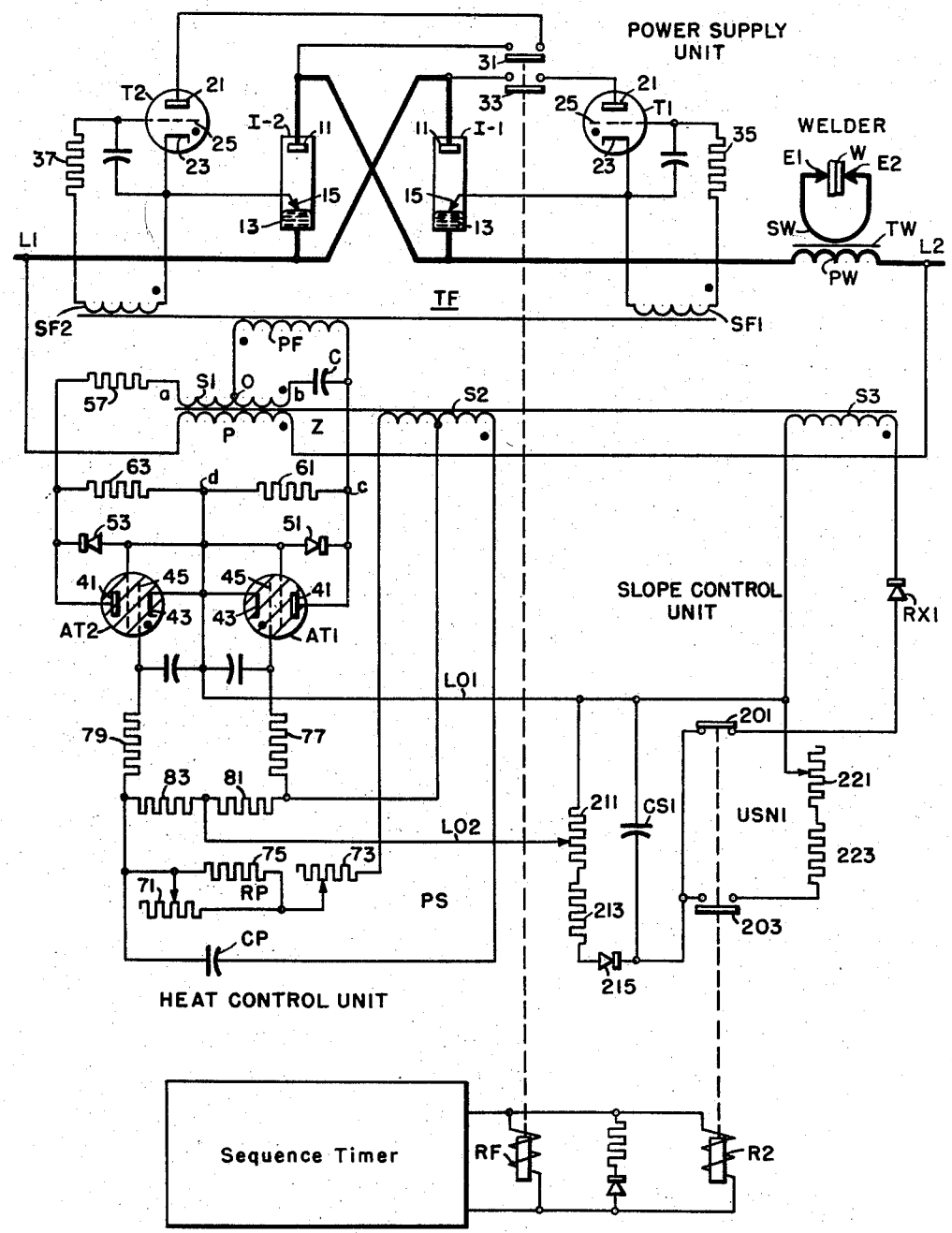
Fig. 2 is a circuit diagram of a modification of the invention.

*Figure 2*

The apparatus shown in Fig. 2 differs from the apparatus shown in Fig. 1 only in that it provides only for pre-heat and weld components and not for an anneal component. In this case, the sequence timer is provided with a relay R2, having normally closed and normally open contacts 201 and 203, respectively. A capacitor CS1 is connected to be charged from the secondary S3 through a rectifier RX1. The negative plate of the capacitor is connected to the conductor LO1. Across this capacitor CS1 a variable resistor 211 and fixed resistor 213 are connected in series with a rectifier 215; these components are of high resistance and do not materially discharge the capacitor CS1. The discharge network USN1 for this capacitor CS1 includes a variable resistor 221 and a fixed resistor 223 is adapted to be connected across the capacitor through the normally open contacts 203 of the relay R2.

In this case, again, the capacitor CS1 is normally charged to a potential such that the thyratrons AT1 and AT2 are rendered conducting late in the half periods of the potential L1 and L2. In the standby condition of this apparatus this has no effect on the thyratrons T1 and T2 and on the ignitrons I–1 and I–2.

To produce a weld with the apparatus, the Sequence Timer is energized and during the weld interval actuates the relays RF and R2. The actuation of the relay RF permits the thyratrons T1 and T2 and the ignitrons I–1 and I–2 to conduct. The actuation of relay R2 stops the charging of the capacitor CS1 and permits its discharge. As the capacitor CS1 discharges, the thyratrons AT1 and AT2 and T1 and T2 are rendered conducting earlier and earlier in the half periods of the potential L1—L2, and the material is pre-heated. Eventually, the capacitor CS1 is completely discharged and for a predetermined time interval determined independently by the setting of the Sequence Timer, current flows to weld the material. Thereafter, the Sequence Timer times out resetting the Slope Control Unit to the original condition. The capacitor CS1 is then charged and AT1 and AT2 are rendered conducting as initially.

In apparatus which has been found to operate satisfactorily, the following components were included in the Slope Control Unit:

| | | |
|---|---|---|
| Resistor 211 | ohms | 100,000 |
| Resistor 213 | do | 150,000 |
| Capacitor CS1 | microfarads | 4 |
| Resistor 221 | ohms | 50,000 |
| Resistor 223 | do | 3,300 |

While certain specific embodiments of the invention have been disclosed herein, many modifications thereof are feasible. In particular, it is to be noted that in accordance with the broader aspects of this invention, thyratrons or equivalent devices may be connected in anti-parallel to charge and discharge capacitor C rather than as shown in Figs. 1 and 2. The showing Figs. 1 and 2 has the advantages that the cathodes 43 are at the same potential rather than at oppositely phased potentials. The invention, therefore, is not to be restricted except insofar as is necessitated by the spirit of the prior art.

I claim as my invention:

1. In combination a capacitor, a first variable resistor, a second variable resistor, a first utilization conductor, a second utilization conductor, a rectifier, first means connecting in a closed series network in the following order said capacitor, said rectifier and said first variable resistor, second means for connecting in a closed series network said capacitor and said rectifier, and said second variable resistor, means connecting said first conductor to said capacitor, third means connecting said first resistor to said second utilization conductor, fourth means for connecting said second resistor to said second utilization conductor, and means for simultaneously rendereing said first and third means ineffective and said second and fourth means effective.

2. Apparatus for supplying an output potential displaced in phase by a predetermined angle relative to a first alternate potential comprising a first terminal, a second terminal and a third terminal between any two of which a second alternating potential is supplied, said second terminal being at a potential intermediate said first and third terminals, a capacitor, a first electric discharge path having an anode, a cathode and a control electrode, a second electric discharge path having an anode, a cathode and a control electrode, said paths being of the type which pass abruptly from a non-conducting to a fully conducting condition as the control potential is changed from a conduction blocking magnitude to a second magnitude permitting conduction, a first rectifier, a second rectifier, means connecting conductively in series said first terminal, said anode of said first path, said cathode of said first path, said first rectifier, said capacitor and said third terminal, means connecting conductively in series said third terminal, said capacitor, said anode of said second path, said cathode of said second path, said second rectifier and said first terminal, means connected to said control electrodes for impressing potentials on said control electrodes which pass from said conduction blocking magnitude to said second magnitude at selectable predetermined instants in the half periods of said second alternating potential to render said paths conducting at said instants, and means connected between said second terminal and said anode of said second path for deriving said output potential.

3. Heat control apparatus including a capacitor, a pair of electric discharge paths, each having an anode, a cathode and a control electrode, and each being of the type which passes abruptly from a non-conducting to a fully conducting condition as its control potential is changed from a first conduction blocking magnitude to a second magnitude permitting conduction, alternating current supply means, means connected to said control electrodes for rendering said paths conducting at predetermined instants in said alternating current, low impedance means connecting said anodes and cathodes in circuit with said capacitor and said supply means to permit said paths when rendered conducting to conduct during alternate half periods of said alternating current and to charge and discharge said capacitor through said anodes and cathodes during said alternate half periods, means connected to said control electrodes for impressing control potentials thereon which pass from said first to said second magnitudes at selectable instants during said alternate half periods, and means for deriving a heat control potential from said circuit; said deriving means connected across said capacitor to derive the potential on said capacitor.

4. Apparatus for supplying an output potential displaced in phase by a predetermined angle relative to a first alternating potential comprising a first terminal and a second terminal for supplying a second alternating potential having a predetermined phase relationship to said first potential, a capacitor, a first electric discharge path having an anode, a cathode and a control electrode, a second electric discharge path having an anode, a cathode and a control electrode, each said path being of the type which passes abruptly from a non-conducting to a conducting condition as the control potential impressed thereon passes from a first conduction blocking magnitude to a second magnitude permitting conduction, means connecting said first terminal, said second terminal, said capacitor and said anodes and cathodes in a circuit such that current may be conducted between said anodes and cathodes of the paths respectively and through said capacitor during alternate half periods of said second potential, means connected to said control electrodes for impressing on said control electrodes control potential which passes from said first magnitude to said second magnitude at selectable predetermined instants in said half periods, deriving means for said output potential, and means connecting said deriving means across said capacitor.

5. Apparatus for supplying an output potential displaced in phase by a predetermined angle relative to a first alternating potential comprising a first terminal and a second terminal for supplying a second alternating potential having a predetermined phase relationship to said first potential, a capacitor, a first electric discharge path having an anode, a cathode and a control electrode, a second electric discharge path having an anode, a cathode and a control electrode, each said path being of the type which passes abruptly from a non-conducting to a conducting condition as the control potential impressed thereon passes from a first conduction blocking magnitude to a second magnitude permitting conduction, means connecting said first terminal, said second terminal, said capacitor and said anodes and cathodes in a circuit such that current may be conducted between said anodes and cathodes of the paths respectively and through said capacitor during alternate half periods of said second potential, means connected to said control electrodes for impressing on said control electrodes control potential which passes from said first magnitude to said second magnitude at selectable predetermined instants in said half periods, deriving means for said output potential, means connecting said deriving means across said capacitor, and resistance means in parallel with each said anode and cathode, said resistance means being so related to said capacitor in magnitude that said output potential lags the first potential in phase by an angle of substantial magnitude of the order of 3/8 periods.

6. Apparatus for supplying an output potential displaced in phase by a predetermined angle relative to a first alternate potential comprising a first terminal, a second terminal and a third terminal between any two of which a second alternating potential is supplied, said second terminal being at a potential intermediate said first and third terminals, a capacitor, a first electric discharge path having an anode, a cathode and a control electrode, a second electric discharge path having an anode, a cathode and a control electrode, said paths being of the type which pass abruptly from a non-conducting to a fully conducting condition as the control potential is changed from a conduction blocking magnitude to a second magnitude permitting conduction, a first rectifier, a second rectifier, means connecting conductively in series said first terminal, said anode of said first path, said cathode of said first path, said first rectifier, said capacitor and said third terminal, means connecting conductively in series said third terminal, said capacitor, said anode of said second path, said cathode of said second path, said second rectifier and said first terminal, a first resistor connected in parallel with said anode and cathode of said first path, a second resistor connected in parallel with said anode and cathode of said second path, means connected to said control electrodes for impressing potentials on said control electrodes which pass from said conduction blocking magnitude to said second magnitude to selectable predetermined instants in the half periods of said second alternating potential to render said paths conducting at said instants, and means connected between said second terminal and said anode of said second path for deriving said output potential, said resistors each being so related to said capacitor that when said paths are non-conducting said output potential is displaced in phase with reference to said first potential by an angle of the order of 3/8 periods.

7. Apparatus for supplying an output potential displaced in phase by a predetermined angle relative to a first alternate potential comprising a first terminal, a second terminal and a third terminal between any two of which a second alternating potential is supplied, said second terminal being at a potential intermediate said first and third terminals, a capacitor, a first electric discharge path having an anode, a cathode and a control electrode, a second electric discharge path having an anode, a cathode and a control electrode, said paths being of the type which pass abruptly from a non-conducting to a fully conducting condition as the control potential is changed from a conduction blocking magnitude to a second magnitude permitting conduction, a first rectifier, a second rectifier, means connecting conductively in series said first terminal, said anode of said first path, said cathode of said first path, said first rectifier, said capacitor and said third terminal, means connecting conductively in series said third terminal, said capacitor, said anode of said second path, said cathode of said second path, said second rectifier and said first terminal, means connected to said control electrodes for impressing potentials on said control electrodes which pass from said conduction blocking magnitude to said second magnitude at instants progressively earlier in successive half periods of a predetermined number of half periods of said second potential beginning with an instant late in the first half period and ending with an instant early in the last half period to increase the conductivity of said paths progressively from said first to said last half period, and means connected between said second terminal and said anode of said second path for deriving said output potential.

8. Apparatus for supplying an output potential displaced in phase by a predetermined angle relative to a first alternate potential comprising a first terminal, a second terminal and a third terminal between any two of which a second alternaing potential is supplied, said second terminal being at a potential intermediate said first and third terminals, a capacitor, a first electric discharge path having an anode, a cathode and a control electrode, a second electric discharge path having an anode, a cathode and a control electrode, said paths being of the type which pass abruptly from a nonconducting to a fully conducting condition as the control potential is changed from a conduction blocking magnitude to a second magnitude permitting conduction, a first rectifier, a second rectifier, means connecting conductively in series said first terminal, said anode of said first path, said cathode of said first path, said first rectifier, said capacitor and said third terminal, means connecting conductively in series said third terminal, said capacitor, said anode of said second path, said cathode of said second path, said second rectifier and said first terminal, means connected to said control electrodes for impressing potentials on said control electrodes which pass from said conduction blocking magnitude to said second magnitude at instants progressively later in successive half periods of a predetermined number of half periods of said second potential beginning with an instant early in the first half period of said number and ending with an instant late in the last half period of said number to decrease the conductivity of said path progressively from said first to said last half period, and means connected between said second terminal and said anode of said second path for deriving said output potential.

References Cited in the file of this patent

UNITED STATES PATENTS

| | | |
|---|---|---|
| 2,008,413 | Dawson | July 16, 1935 |
| 2,504,834 | Hartwig | Apr. 18, 1950 |
| 2,681,428 | Rockafellow | June 15, 1954 |
| 2,711,506 | Johnsen et al. | June 21, 1955 |
| 2,739,281 | Rockafellow | Mar. 20, 1956 |